US006603967B1

(12) United States Patent
Sinivaara et al.

(10) Patent No.: US 6,603,967 B1
(45) Date of Patent: Aug. 5, 2003

(54) CALL ROUTING IN A RADIO SYSTEM

(75) Inventors: Hasse Sinivaara, Espoo (FI); Esa Haakana, Espoo (FI); Teppo Tossavainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/516,971

(22) Filed: Feb. 29, 2000

Related U.S. Application Data

(63) Continuation of application No. PCT/FI98/00679, filed on Aug. 31, 1998.

(30) Foreign Application Priority Data

Sep. 3, 1997 (FI) .................................................. 973595

(51) Int. Cl.$^7$ ................................................ H04Q 7/20
(52) U.S. Cl. ...................... 455/431; 455/428; 455/445; 455/560
(58) Field of Search ................................ 455/430, 431, 455/436, 437, 33.2, 403, 422, 427, 428, 445, 435, 560, 561, 562, 433

(56) References Cited

U.S. PATENT DOCUMENTS

| | | | | |
|---|---|---|---|---|
| 5,109,527 A | * | 4/1992 | Akerberg | 455/33.2 |
| 5,519,761 A | | 5/1996 | Gilhousen | |
| 5,651,050 A | * | 7/1997 | Bhagat et al. | 455/431 |
| 5,950,129 A | * | 9/1999 | Schmid et al. | 455/431 |
| 5,995,833 A | * | 11/1999 | Zicker | 455/430 |
| 6,055,425 A | * | 4/2000 | Sinivaara | 455/431 |
| 6,275,702 B1 | * | 8/2001 | Peltonen | 455/436 |
| 6,321,084 B1 | * | 11/2001 | Horrer | 455/431 |

FOREIGN PATENT DOCUMENTS

| | | |
|---|---|---|
| EP | 0 802 639 | 10/1997 |
| GB | 2 310 973 | 9/1997 |
| GB | 2320992 | 7/1998 |
| WO | 94/08406 | 4/1994 |
| WO | 94/28684 | 12/1994 |
| WO | 98/06189 | 2/1998 |
| WO | 98/26521 | 6/1998 |

OTHER PUBLICATIONS

"The GSM System for Mobile Communications" Mouly, et al. 1992.
International Search Report for PCT/FI98/00679.

* cited by examiner

Primary Examiner—Dwayne Bost
Assistant Examiner—Ronald J. Ward
(74) Attorney, Agent, or Firm—Squire, Sanders & Dempsey LLP

(57) ABSTRACT

Disclosed herein is a radio system and method for routing a subscriber's call via a moving base station. The radio system includes at least one moving base station. A moving location area is formed using the service areas of the moving base station. A control unit of at least one operator is dedicated to controlling the operation of the moving base stations belonging to the moving location area. Calls made by a subscriber in a service area of the moving base station are routed from the subscriber terminal via a moving base station, a relay satellite and a ground earth station to one dedicated control unit. Calls to a subscriber located in the moving location area are routed from one dedicated control unit via a ground earth station, a relay satellite and the moving base station to the subscriber terminal.

10 Claims, 4 Drawing Sheets

CALL ROUTING IN A RADIO SYSTEM

This application is a continuation of international application serial No. PCT/FI98/00679, filed Aug. 31, 1998

FIELD OF THE INVENTION

The invention relates to call routing via a moving base station in a radio system, and to a radio system.

BACKGROUND OF THE INVENTION

Known aircraft telephone systems operate like closed radio networks. In these systems, aircraft passengers and crew can use terminals in an aircraft to call to subscribers in a terrestrial telephone network. The calls made are charged, for example, on a credit card. FIG. 1 of the attached drawing shows in a block diagram the structure of an aircraft telephone system. A call made from a telephone system 10 located in an aircraft is routed via a satellite 12 to a ground earth station GES, whose transceiver TRX forwards the call via a switch SW to the subscriber through a public switched telephone network PSTN. A few simultaneous calls can be connected and routed from an aircraft.

FIG. 2 of the attached drawing shows a simplified block diagram of the Global System for Mobile communications (GSM). A mobile station MS is connected over a radio path to a base transceiver station BTS, in FIG. 2 to BTS1. A base station controller BSC controls the operation of the base transceiver stations BTS dedicated to it. A base station sub-system BSS comprises the base station controller BSC and base transceiver stations BTS controlled by the base station controller BSC. A mobile services switching centre MSC usually controls several base station controllers BSC. The mobile services switching centre MSC is connected to other mobile services switching centres and the GSM network is connected via a gateway mobile services switching centre GMSC to other networks such as a public switched telephone network PSTN, another land mobile network PLMN or an ISDN network. The operation of the entire system is controlled by an operation and maintenance centre OMC.

The subscriber information of a mobile station MS is stored permanently in the home location register HLR of the system and temporarily in the visitor location register VLR of the area in which the mobile station MS is currently located. During location update, the information stating the visitor location register VLR, whose area the mobile station MS is in, is updated to the home location register HLR. The location information of the mobile station MS is stored in the visitor location register VLR with an accuracy of the location area LA. The geographical area controlled by the visitor location register is divided into one or several location areas LA, which can each have one or several base transceiver stations BTS. Each base transceiver station BTS continuously transmits information for all of the mobile stations on its broadcast channel. This information includes the base station identity code BSIC, the location area identifier LAI and information about the frequencies of the neighboring base stations to be measured by the mobile stations MS. When the mobile station MS moves so that the received location area identifier changes, the mobile station starts the location update for the network.

The location information in the subscriber information of the mobile station is used, for example, for routing calls. In a mobile communications system of the GSM type, a mobile terminating call is routed to the mobile services switching centre MSC of the current location area of the mobile station MS according to the location information in the home location register HLR. On the basis of the information in the visitor location register VLR, a paging message is sent for the mobile station MS on the paging channels of all of the base transceiver stations BTS of the current location area. After the mobile station MS has responded, the call is connected on a channel of that base transceiver station BTS through which the mobile station MS responded to the paging message. A mobile communications network identifies the mobile station MS on the basis of the international mobile subscriber identity IMSI stored on the SIM card of the mobile station MS and/or on the basis of the temporary mobile subscriber identity TMSI given by the visitor location register VLR to the mobile station MS.

Cellular radio networks such as the GSM system described above are designed only for terrestrial use. Therefore, it is not possible to use a mobile station of terrestrial type in an aircraft, especially as it is forbidden by the authorities. Also the moving nature of an aircraft presents a problem. In the aircraft telephone system described above, the problem is the fact that the system can only route a few simultaneous calls. Additionally, the calls are charged on a credit card and passengers cannot receive calls during the flight.

SUMMARY OF THE INVENTION

The object of this invention is to enable call routing between a moving target, such as an aircraft or a ship, and a public land mobile communications network.

This is achieved by using a method according to the invention characterized by what is stated in the independent claim 1. Specific embodiments of the invention are presented in the dependent claims.

The invention relates also to a radio system characterized by what is stated in the independent claim 7.

The invention is based on the idea of routing the calls between the mobile services switching centre and the ground earth station via a dedicated control unit in a mobile communications system. Between the ground earth station and a moving cell, such as an aeronautical cellular network (ACNW) in an aircraft, the calls are routed via a satellite.

The advantage in this kind of call routing is that it is suitable for routing calls from subscribers of any cellular networks even when the terrestrial networks are not compatible. The method can also be used, for example, in routing data or signaling messages. An additional benefit is the fact that charging is handled by the subscriber's operator.

The method according to the invention also has the advantage of minimizing signaling in the network. The reachability of the subscriber is also made better.

The advantage of the radio system according to the invention is that the call relaying capacity can be arranged to be sufficient.

BRIEF DESCRIPTION OF THE FIGURES

The invention is now described more closely in connection with embodiments of the invention referring to the example in FIGS. 3 and 4 of the attached drawings, in which.

DETAILED DESCRIPTION OF THE INVENTION

Figure 1:
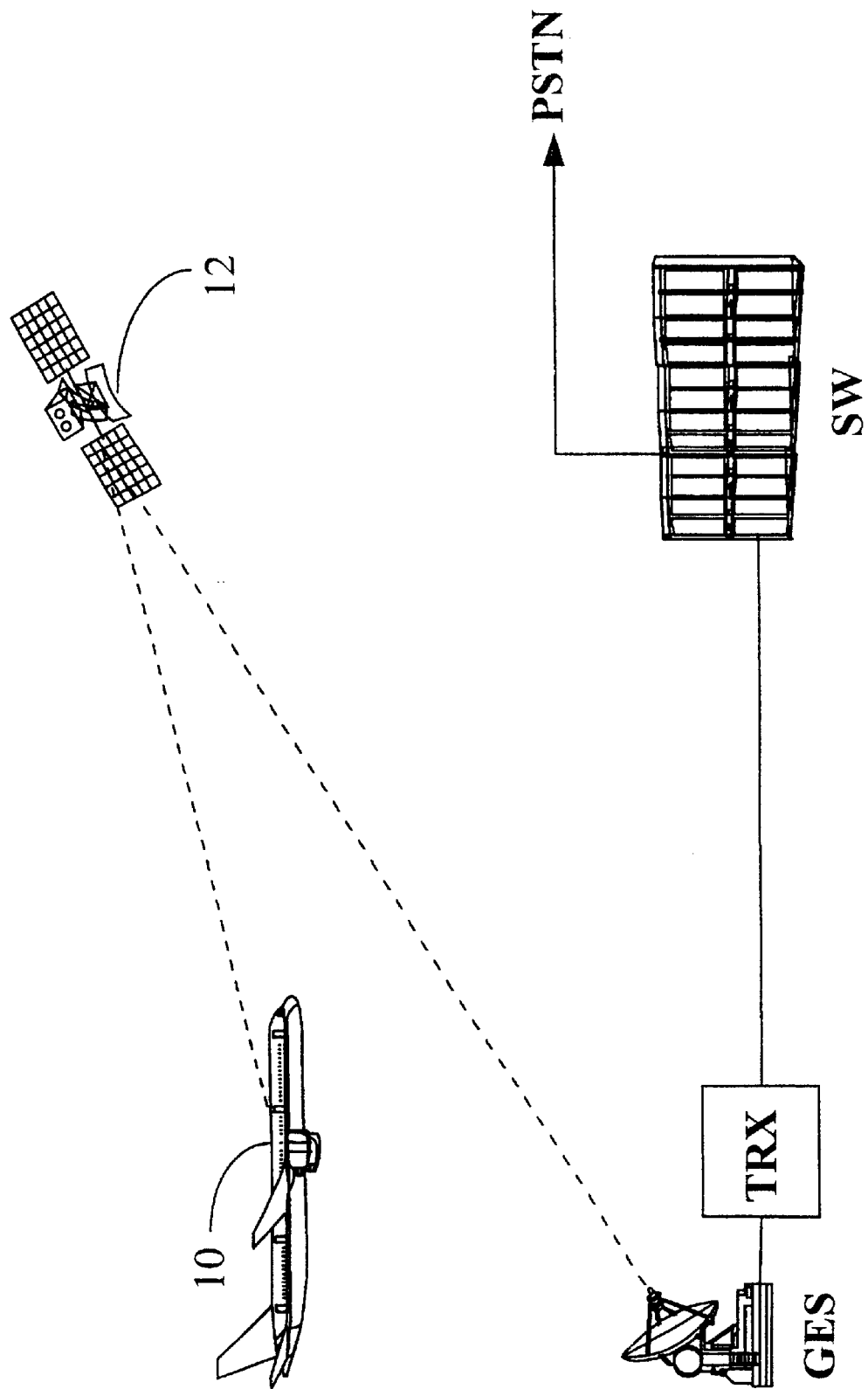
FIG. 1 shows the structure of a known aircraft telephone system.
Figure 2:
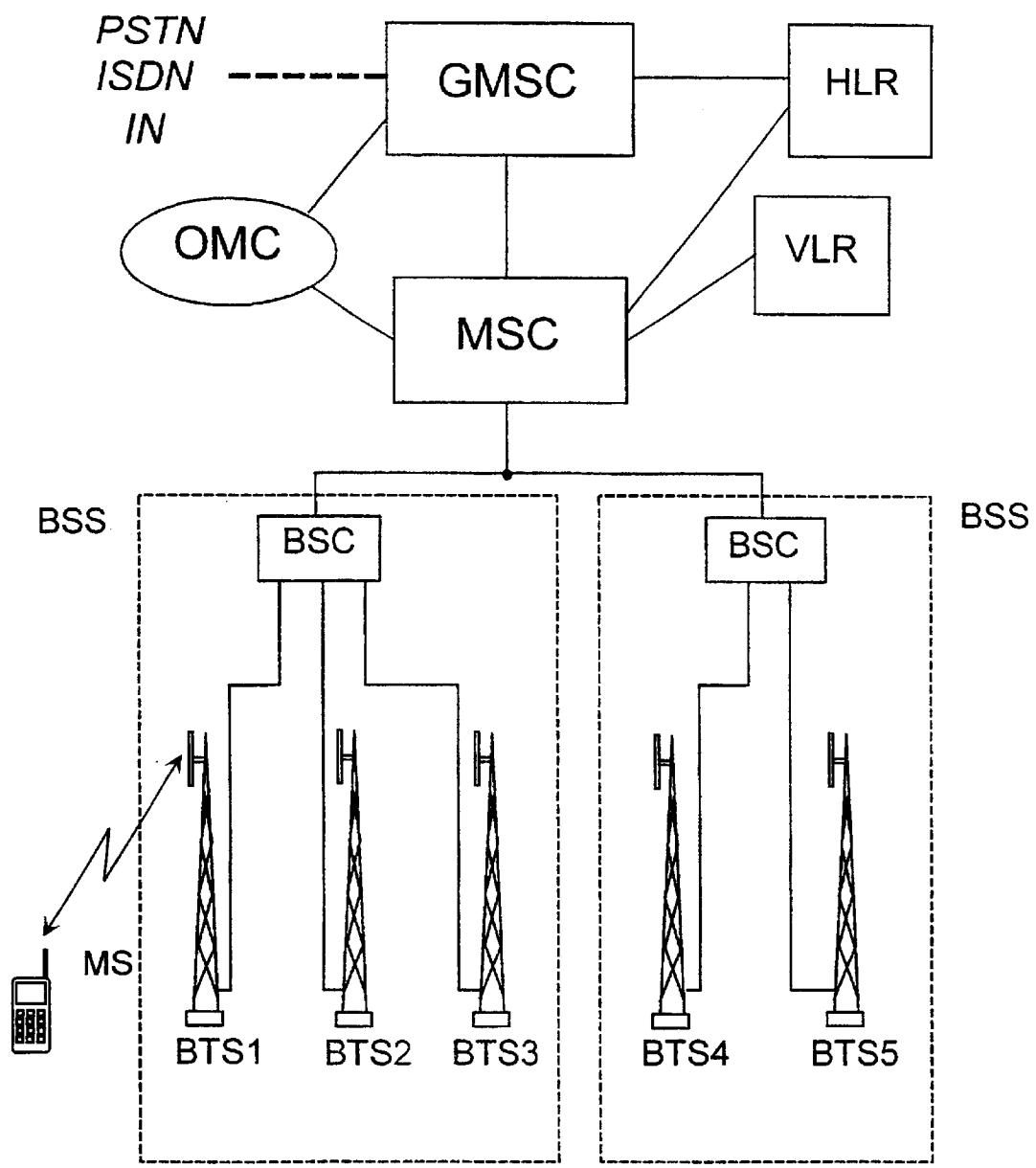
FIG. 2 shows the parts of a known mobile communications network that are relevant for the invention.

The invention can be applied in connection with any mobile communications system. As an example, the invention is described below in more detail primarily in connection with the digital GSM system. FIG. 2 shows the simplified structure of a GSM network as described earlier. For a more detailed description of the GSM system, a reference is made to GSM specifications and to the book: "The GSM System for Mobile Communications", M.Mouly & M. Pautet, Palaiseau, France, 1992, ISBN:2-9507190-0-7.

The invention is described in more detail below in connection with the primary embodiment of the invention with reference to FIG. 3.

Figure 3:
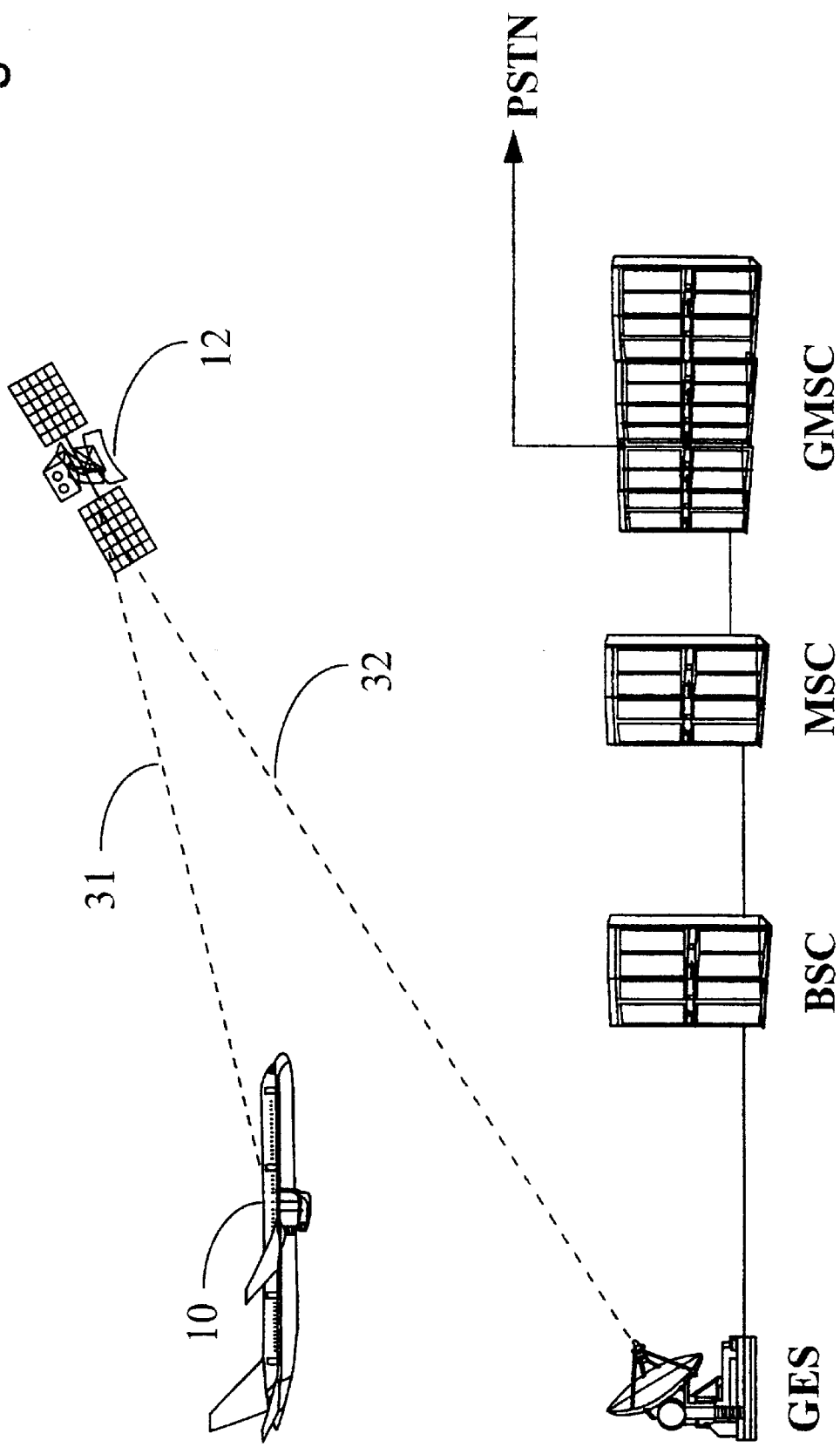
FIG. 3 shows the structure of a radio system according to the primary embodiment of the invention.

FIG. 3 shows an arrangement for connecting an aeronautical cellular network to a terrestrial mobile communications system. A cellular network 10 located in an aircraft preferably comprises a base station, terminals connected to it in some allowed manner and an aeronautical earth station (AES) located in an aircraft for relaying calls between the aircraft and a satellite. The terminals include a unit for identifying the subscriber. For example, in the case of a GSM subscriber this unit is a SIM card, which contains, for example, the international mobile subscriber identity IMSI. The subscriber information stored in the public mobile communications system can be found by means of the IMSI. The identification of the mobile subscriber with the SIM card makes it possible to charge the calls made by the subscriber via the mobile communications network. The subscriber can also be reached during a flight, since the network is informed about the information in the SIM card in the location update performed during the registration. The method of realizing the connections between the terminals and the base station in the aeronautical cellular network is not essential to the invention.

According to the primary embodiment of the invention, a call is routed between the subscriber located in an aeronautical cellular network and the mobile services switching centre MSC via a satellite 12, a ground earth station GES and the base station controller BSC dedicated to this ground earth station in the mobile communications system. The following describes the primary embodiment of the invention in detail in a case which concerns the routing of a call originated by a mobile subscriber traveling in an aircraft. The mobile originating call is transferred via a base station located in the aircraft to the aeronautical earth station (AES) from which the call is transmitted over a radio path 31 to a satellite 12, which is preferably a relay satellite meant for public satellite traffic. From the satellite 12 the call is transmitted over a radio path 32 to the ground earth station GES from which the call is transferred to the base station controller BSC dedicated to this ground earth station. From the base station controller BSC the call is transferred to the mobile services switching centre MSC from which the call is routed to the desired subscriber in some mobile communications system or via a public telephone network to another network.

As the subscriber registers with the aeronautical cellular network by using a terminal, location update is carried out in the terrestrial mobile communications system. During the update the information about the location of the mobile subscriber is stored into the visitor location register VLR of the network and to the home location register HLR of the subscriber. On the basis of this location information, calls made to the mobile station MS can be routed according to the invention as described in more detail in the following. For example, when trying to reach a mobile subscriber traveling in an aircraft, the home location register HLR of the subscriber and the visitor location register VLR, whose area the subscriber is currently on, are asked for the subscriber location information according to prior art. On the basis of the location area information of the subscriber, the call is routed to a mobile services switching centre MSC and from there to the base station controller BSC controlling the moving location area of the subscriber. The base station controller BSC relays the call via a ground earth station GES, a satellite 12, an aeronautical earth station (AES) located in an aircraft, and a moving base station to the terminal of the mobile subscriber.

In the primary embodiment of the invention the base station controller BSC dedicated to a ground earth station GES is in fixed connection to the ground earth station. This base station controller BSC controls the operation of the moving base station located in an aircraft regardless of the physical location of the aircraft at any given moment. Therefore, the moving location area formed by the service area of the moving base station is controlled by the base station controller BSC dedicated to this ground earth station GES, and all traffic and signaling to and from this location area are handled by the base station controller BSC in question. For example, the national telecommunications operator of the airline company can be authorized to control a moving base station. Thus, for example, Telecom1 can be authorized to control moving base stations located in the aircrafts of Airline 1 and to handle the traffic and signaling via its own mobile communications network. The satellite link is transparent as concerns the traffic and signaling, so it is compatible with different cellular systems.

Figure 4:
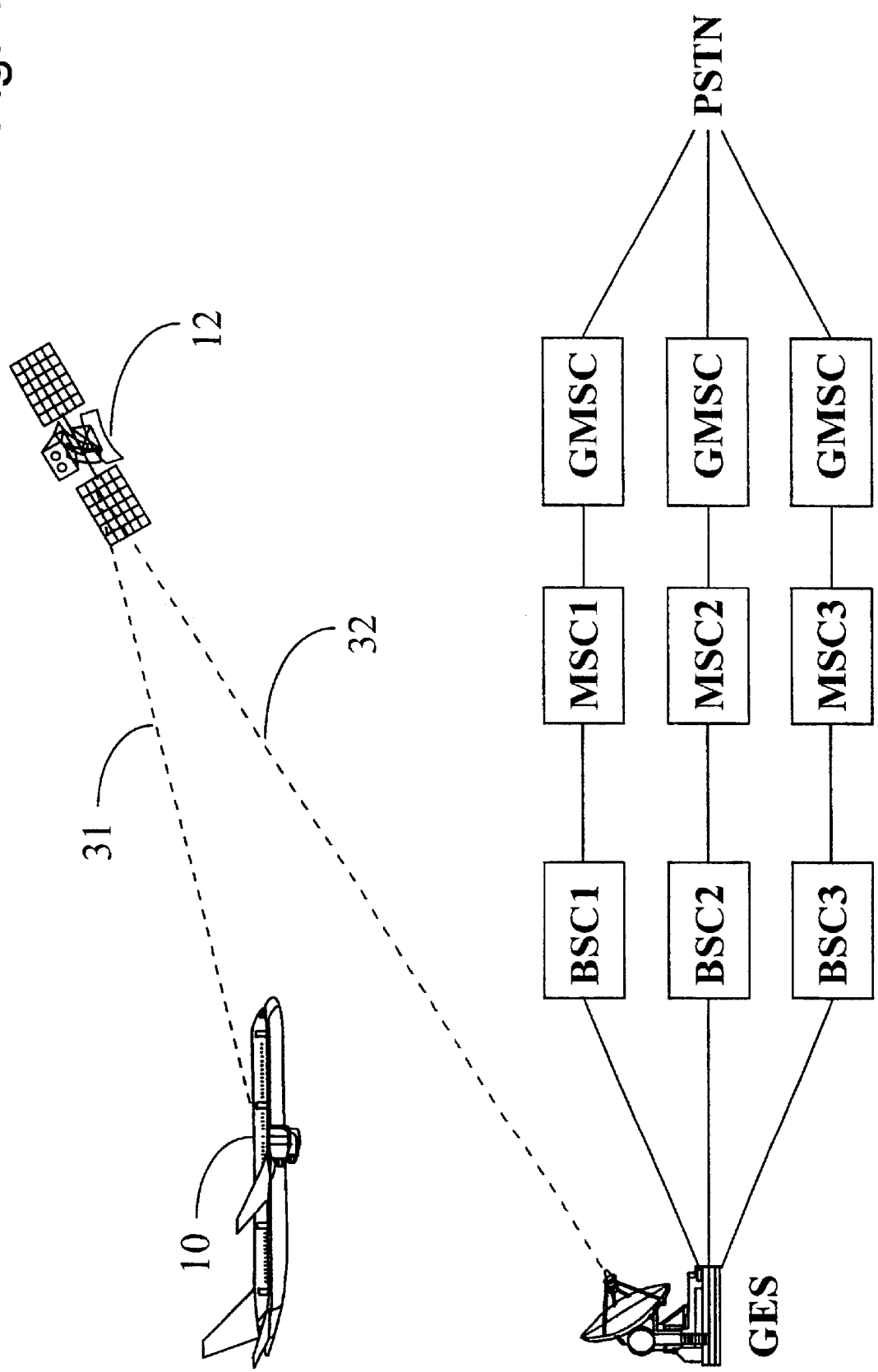
FIG. 4 shows the structure of a radio system according to the secondary embodiment of the invention.

In the secondary embodiment of the invention, the call routing, traffic and signaling are relayed through the base station controller of the mobile communications network of the subscriber's home operator dedicated to the ground earth station GES. Otherwise, the arrangement corresponds to the arrangement described above in connection with the primary embodiment of the invention. In the following, call routing according to the secondary embodiment of the invention is described in detail with reference to FIG. 4 in a case of a mobile originating call. The mobile originating call is transferred via a base station located in the aircraft to the aeronautical earth station (AES) from which the call is transmitted over a radio path 31 to a satellite 12, which is preferably a relay satellite meant for public satellite traffic. From the satellite 12 the call is transmitted over a radio path 32 to the ground earth station GES from which the call is transferred to the base station controller BSC of the mobile communications network of the subscriber's home operator, the BSC being dedicated to the ground earth station in question. From the base station controller BSC the call is transferred to the mobile services switching centre MSC from which the call is routed to the desired subscriber in a mobile communications system or via a public telephone network to another network.

Routing of a call terminating to a subscriber located in an aircraft is realized according to the secondary embodiment of the invention as described in more detail in the following. On the basis of the location area information received from the subscriber's home location register HLR and from the visitor location register VLR, the call is routed to a mobile services switching centre MSC and from there to the base station controller BSC of the mobile communications network of the subscriber's home operator controlling the moving location area, the BSC being dedicated to relay traffic of the ground earth station GES in question. The base station controller BSC transfers the call via a ground earth station GES, a satellite 12, an aeronautical earth station (AES) located in an aircraft, and a moving base station to the terminal of the mobile subscriber.

In an arrangement according to the secondary embodiment of the invention, the controlling of a moving location area can be done with base station controllers of several operators BSC1, BSC2, BSC3, these controllers being in fixed connection with the ground earth station GES. In this case, for example, a call made by a Telecom2 subscriber is routed from an aircraft of Airline 1 via a satellite 12, a ground earth station GES and a base station controller BSC2 dedicated by Telecom2 to the ground earth station GES, whereas a call made by a Telecom1 subscriber traveling in the same aircraft of Airline 1 is routed via the satellite 12, the ground earth station GES and a base station controller BSC1 dedicated by Telecom1 to the ground earth station GES.

The base station controller BSC dedicated to a ground earth station GES and described above in connection with the primary and secondary embodiments of the invention, can be set to control one or several base stations located in a moving target, for example, in an aircraft, and thus to control the cell formed by the service area of the base station. For example, the service areas of base stations located in several different aircrafts can form one moving location area, which is controlled by the base station controller according to the invention. From the cells formed by the moving base stations of a moving location area, preferably no handovers to other terrestrial or moving cells is done, especially while the moving cell is moving. Correspondingly, no handovers are done from other cells to these cells of moving base stations.

The drawings and the related description are only intended to demonstrate the principles of the invention. The details of call routing according to the invention can vary within the claims. Even though the invention is described above primarily in connection with an aeronautical cellular network located in an aircraft, the method can also be used for connecting other kinds of moving cells, such as cells located in a ship, to a conventional mobile communications system. In this application, the call routing includes also the routing of other connections, such as data connections and short messages, and the routing of signaling. The method according to the invention is suitable for connecting a moving cellular network to any other public cellular network.

What is claimed is:

1. A method for routing a subscriber's call via a moving base station in a radio system, the radio system comprising mobile stations, base stations, at least one control unit for controlling the operation of the base stations, and at least one moving base station, the method comprising:

establishing a moving location area including only service areas of moving base stations of the radio system and covering at least a service area of one moving base station;

dedicating a stationary control unit of at least one operator to control operation of moving base stations belonging to the moving location area, resulting in at least one dedicated control unit;

routing calls made by a subscriber within the service area of one of the moving base stations from the subscriber terminal via one moving base station, a relay satellite and a ground earth station to one of the at least one dedicated control units in fixed connection with the ground earth station; and routing calls to a subscriber located in the moving location area from one dedicated control unit via a ground earth station in fixed connection with the dedicated control unit, a relay satellite and the moving base station to the subscriber terminal.

2. A method according to claim 1, wherein a control unit of one operator is dedicated to control operation of the moving base stations belonging to the moving location area.

3. A method according to claim 1, wherein calls are routed between a subscriber terminal located in a moving location area and a control unit of a subscriber's home operator.

4. A method according to claim 1, further comprising routing over a satellite path network signaling needed between a moving base station of the radio system and a dedicated control unit of the radio system, the dedicated control unit being dedicated to a ground earth station.

5. A method according to claim 1, further comprising preventing at least for a duration of moving of the moving base station, a subscriber terminal's handover from the base station of the moving location area to other base stations.

6. A method according to claim 1, further comprising preventing at least for a duration of moving of the moving base station, subscriber terminals other than terminals registered into a network via a moving base station from connecting to the moving base station.

7. A radio system comprising mobile stations, base stations and at least one control unit for controlling the operation of the base stations, the radio system further comprising:

at least one moving base station, service areas of the moving base stations of the radio system forming at least one moving location area which comprises only service areas of moving base stations, the moving location area covering the service area of at least one moving base station, and at least one dedicated stationary control unit for controlling the moving base stations of the radio system, the control unit being in fixed connection with a ground earth station for a relay satellite.

8. A radio system according to claim 7, wherein the at least one dedicated control unit is arranged to control moving base stations of the radio system such that one moving base station is controlled by one dedicated control unit only.

9. A radio system according to claim 7, wherein the at least one dedicated control unit is arranged to control moving base stations of the radio system such that calls are routed via a dedicated control unit of a home operator of a subscriber located in the moving location area.

10. A radio system according to claim 7, wherein there is a satellite path between one of the at least one moving base stations and one of the at least one dedicated control units.

* * * * *